United States Patent [19]

Reiffert et al.

[11] Patent Number: 4,515,183

[45] Date of Patent: May 7, 1985

[54] PNEUMATIC CONTROL VALVE

[75] Inventors: Werner Reiffert, Bochum; Dieter Peters, Witten; Joachim Wiendahl, Dortmund, all of Fed. Rep. of Germany

[73] Assignee: J. D. Neuhaus, Witten, Fed. Rep. of Germany

[21] Appl. No.: 484,214

[22] Filed: Apr. 12, 1983

[30] Foreign Application Priority Data

Apr. 21, 1982 [DE] Fed. Rep. of Germany ....... 3215290

[51] Int. Cl.³ ............................................. F16K 11/00
[52] U.S. Cl. .............................. 137/625.21; 137/495; 91/433; 91/467
[58] Field of Search ....................... 137/625.21, 625.22, 137/625.23, 625.17, 625.43, 494, 495, 625.42; 91/433, 468, 466, 467

[56] References Cited

U.S. PATENT DOCUMENTS 110,041 12/1870 Holloway ....................... 137/625.21
1,774,685 9/1930 Vickers ........................... 137/625.22

FOREIGN PATENT DOCUMENTS 701968 1/1941 Fed. Rep. of Germany ....................... 137/625.21
303238 1/1929 United Kingdom ............... 137/494

Primary Examiner—Martin P. Schwadron
Assistant Examiner—John S. Starsiak, Jr.
Attorney, Agent, or Firm—Banner, Birch, McKie & Beckett

[57] ABSTRACT

The invention relates to a pneumatically driven control valve for the reversible operation of a pneumatic unit. In an addition to an air distribution system for regulating the speed of the pneumatic unit, the control valve incorporates an air volume control system which is fully integrated into the air distribution system. The key component is a rotary slide valve, the rotation of which distributes the compressed air while its axial displacement throttles the air stream flowing through the valve, the degree of throttling depending upon the pressure level of the compressed air delivered to the pneumatic unit. In this way, the control valve is kept simple in construction with very few moving parts and high functional accuracy.

14 Claims, 4 Drawing Figures

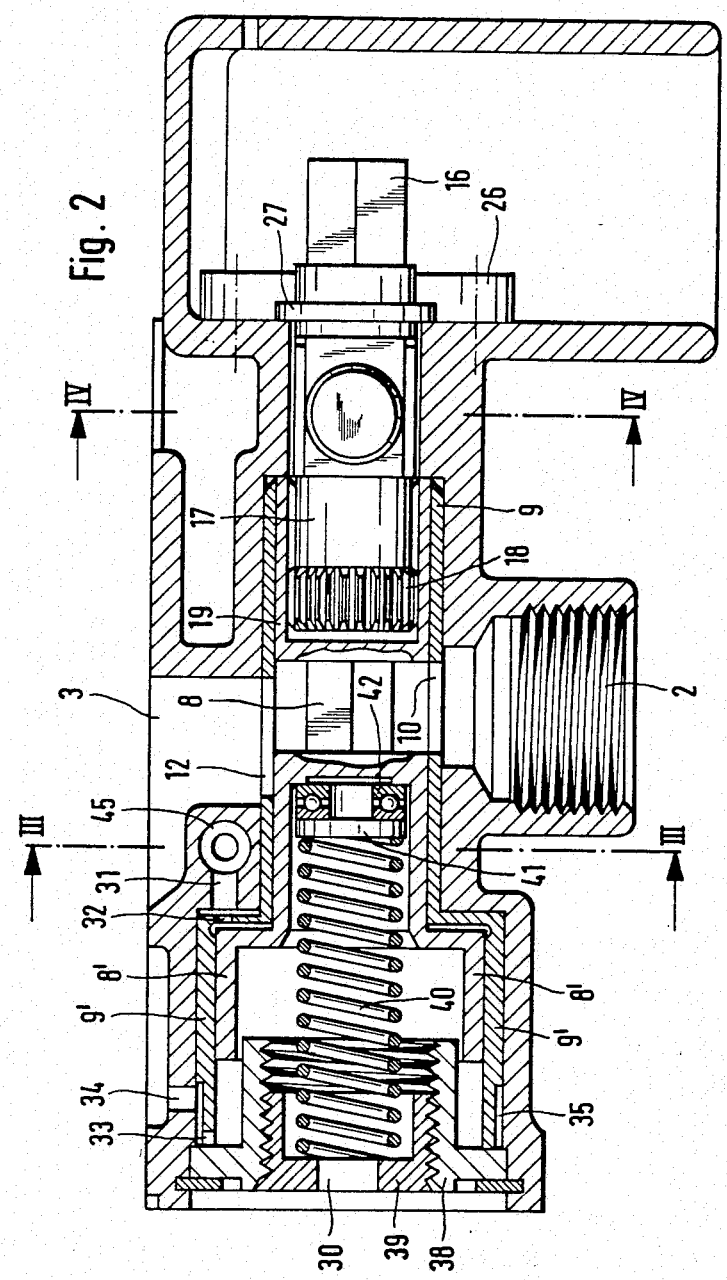

PNEUMATIC CONTROL VALVE

BACKGROUND OF THE INVENTION

This invention relates to a pneumatic control valve for actuating the forward motion and reverse motion of a pneumatically driven apparatus from a rest position, in which, the movement of a slide valve in one direction or the other establishes a connection between a compressed air supply and either a forward channel or reverse channel and connects the other of the two channels to a non-pressurized scavenging air line in which control valve the stream of air flowing through the valve is throttled in dependence upon the particular pressure level prevailing.

Pneumatic control valves of this type have long been known. They are present, in particular, in so-called direct control systems, i.e. systems in which the power stream delivered to the pneumatic unit is controlled (cf. German Utility Model 81 17 890). Pneumatic crabs or pneumatic shunting trolleys on single-rail suspension railways are, for example, operated in this way. In this case, the control valve is either directly flanged onto the unit, so that cable or rod operation must be present, or, alternatively, the control unit hangs on a support from the apparatus, so that it is within reach of the operator.

Irrespective of the particular installation position, which affects the design of the valve, the pneumatic control valve should be as small as possible in its overall dimensions which, on the one hand, ensure a minimal space requirement and, on the other hand, provides for ease of handling. However, equal importance is attributed to structural simplicity in valves of the type in question to eliminate the risk of breakdown as far as possible. Operational breakdown are particularly unwelcome in underground work on account of the difficulty of carrying out repairs.

Hitherto known pneumatic control valves incorporate two operating units, namely the air distribution system on the one hand, and the air volume control, i.e. maintenance of a predetermined pressure, on the other hand. In some constructions, the two units are arranged separately from one another and are interconnected by hoses. The additionally required hose makes for a certain vulnerability, in addition to which the hoses in general can give rise to troublesome side-effects by which operation is adversely affected. Although pneumatic control valves which have no additional hoses are already known, they still incorporate both operating units, resulting in a correspondingly complicated structure.

Accordingly, an object of the present invention is to provide a pneumatic control valve of the type described at the beginning which is safe in operation and particularly simple in structure, i.e. contains very few moving parts.

SUMMARY OF THE INVENTION

According to the invention, there is provided a pneumatic control valve for actuating the forward motion and reverse driving motion of a pneumatic apparatus from a rest position, in which the movement of a slide valve in one direction or the other establishes a connection between a compressed air supply and either a first channel or a second channel while connecting the other of the two channels to a non-pressurized scavenging air line and in which control valve the stream of air flowing through the valve is throttled in dependence upon the particular pressure level prevailing. The control valve is characterized in that the slide valve is in the form of a rotary slide valve having the compressed air supply and the channels situated substantially in the same plane, in that the rotary slide valve is mounted for axial displacement perpendicularly of that plane and in that, with increasing axial displacement of the rotary slide valve, a shut-off member adjacent the rotary slide valve throttle the stream of air flowing through to an increasing extent.

Hitherto, separate elements in the form of multi-stage slide valves and stepped pistons, respectively, have been used for distribution and volume control of the compressed air. Now, the present invention proposes for the first time using a single element for distribution and volume control, its rotation being used for distribution and its axial displacement for volume control. This eliminates approximately half of the seatings and fittings hitherto considered necessary, so that the control valve according to the invention is particularly simple in structure and hence reliable in operation.

Rotary slide valves for air distribution are known per se so that no protection in the form of an independent invention is being claimed for the construction of the slide valve in the form of a rotary slide valve. Rather, the invention is based on the realization that the required functions can be produced by superimposing two movements on one and the same component.

Particularly effective guiding of the rotary slide valve is obtained by the arrangement on either side of cylindrical sections having the same diameter which, moreover, is also identical with the diameter of the curved sealing surfaces of the rotary slide valve. One of these cylindrical sections serves as a shut-off member whilst the other establishes the connection to a piston on which the axial displacement forces act.

To facilitate machining in the production of a valve according to the invention, it is advisable to guide the rotary slide valve, including the adjacent cylindrical sections, in a sleeve which, for the supply of compressed air, comprises inflow and outflow openings corresponding to the first and second channels. The axial boundary of these openings simultaneously forms the control edges for volume control whereas their radial edges are used for determining distribution.

The rotary slide valve is preferably rotated back and forth by means of an actuating element in which a manual actuation system in the form of a cable-operated lever or double-armed lever (not shown) may be arranged for that purpose.

For separating the axial movement of the rotary slide valve from the actuating element, these parts are interconnected by a coupling which is fixed for rotation but allows axially displaceable movement between the two parts. This coupling may be easily formed by slidably interengaging members having mating internal and external multi-toothed profiles such as a splined coupling. A return mechanism may be present on the rotary slide valve, on an immediately adjacent element or on the actuating element, for automatically turning the rotary slide valve back into its rest position when the actuating lever is released.

The axial displacement of the rotary slide valve is effected by means of a piston which is exposed to different forces and effects a displacement until a state of equilibrium prevails thereon. A piston pressurised at one end is preferably used for this purpose, being supported by a spring at its non-pressurised end. The intensity of the pressure applied to the piston depends upon the pressure level in the particular channel which is controlled by the angle of rotation of the rotary slide valve. In order, in this connection, to connect only the controlled channel to the corresponding piston surface, the invention provides a switch which automatically shuts off the feed line to the piston surface from the vented channel. In this way, only the pressure level prevailing at the particular controlled starting point acts on the piston. When a pressure builds up in the channel, the pressure on the piston surface increases, resulting in displacement against the force of a spring and hence in partial shut-off of the airways past the rotary slide valve. In this way, the inflow of compressed air is partly interrupted so that the pressure prevailing in the corresponding channel also does not increase any further. A state of equilibrium is thus established and is automatically maintained under stationary bleeding conditions. If the pressure conditions prevailing in the corresponding channel change, the slide valve is displaced even further to increase the throttling effect (in the event of an increase in pressure) or approaches the starting position under the effect of the spring (in the event of a reduction in pressure).

BRIEF DESCRIPTION OF THE DRAWINGS

An embodiment of the invention will now be described by way of example, with reference to the accompanying drawings, in which:

FIG. 2 is a cross-section on the line II—II in FIG. 1;

DETAILED DESCRIPTION OF THE INVENTION

Figure 1:
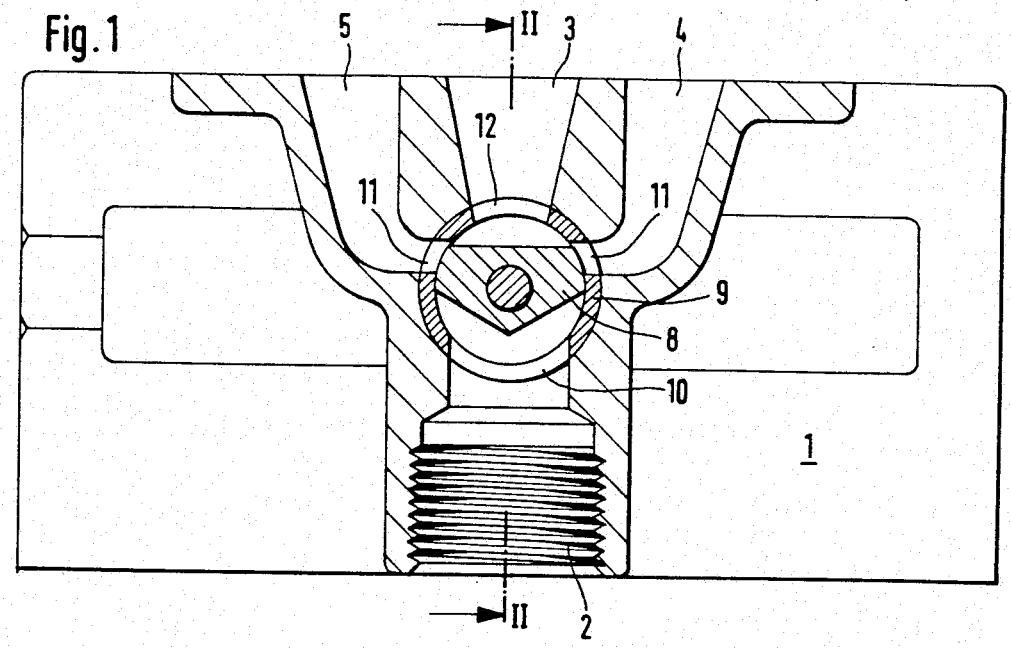
FIG. 1 is a cross-section on a first plane through one embodiment of the pneumatic control valve according to the invention.

FIG. 1 is a section through that plane of the pneumatic control valve according to the invention in which the corresponding connections are essentially situated. A compressed air supply connection 2 is provided inside a valve housing 1 on its lower side, and has a standard screwthread for tubes and hoses. Arranged immediately opposite, on the upper side, are a scavenging air outlet 3 and—laterally on each side thereof—a first channel 4 and a second channel 5. These latter expressions are to be understood to mean that, when pressure is applied to one of the channels the controlled pneumatic unit is subjected to a corresponding direction of movement, including of course a linear movement, in which case the movements become forward and reverse movements.

A rotary slide valve 8 which is mounted in a sleeve 9 is arranged at the centre of the valve housing 1, intermediate all the feed lines and channels. The sleeve has an inflow opening 10 underneath lateral outflow openings 11 and a scavenging air opening 12 which respectively establish the connection of the rotary slide valve chamber with the lines communicating therewith. By means of an actuating mechanism which will be described in detail hereinafter, the rotary slide valve can be turned back and forth through about 30° from the horizontal rest position illustrated, to any intermediate position. As a result, compressed air flows from the compressed air supply connection 2 either into the first channel 4, in which case the second channel 5 is connected with the scavenging air outlet 3, or into the second channel 5, in which case the outlet 3 communicates with first channel 4.

It can be seen from FIG. 2 that the compressed air supply is arranged substantially in the middle of the control valve. The two channels 4 and 5, and outlet 3 are situated above the rotary slide valve 8, the scavenging air outlet 3 being visible because the section is taken through the middle.

An actuating element 17 is mounted for rotation on the right side of the rotary slide valve 8 as shown on FIG. 2. This element is accessible from the outside via an operating square end 16. Square end 16 may be fitted (not shown) with either a hand operated lever or a double-armed lever, from both sides of which there would depend cables or rods for actuating a control vave mounted to lie outside of the reach of the operator. Rotational movement is transmitted from the square end 16 through the actuating element 17 via an external multi-toothed profile 18 which matingly interengages with an internal multi-toothed profile on a cylinder 19. Cylinder 19 has an external solid cylindrical form which does not have any control surfaces or the like. Cylinder 19 forms the shut-off member at the end of cylinder 19 adjacent the rotary slide valve 8, this shut-off member always coming into operation when the rotary slide valve 8 is axially displaced to the left as shown on FIG. 2.

In the event of such axial displacement, the actuating element 17 remains in its rest position retaining its rigid driving connection to the cylinder 19 through the mating multi-toothed profiles at 18 and interiorly of cylinder 19. The manner in which the axial displacement of the rotary slide valve 8 is generated is explained in further detail below. Reference will first be made to a return mechanism for automatically centering the actuating element 17 in its rest position and hence positioning the rotary slide valve 8 in its shut-off position as shown on FIG. 1. Between the multi-toothed profile 18 and the square end 16, the actuating element 17 is provided with a spreader cam 21 as shown on FIG. 4. Both sides of cam 21 are contacted by return jaws 22 with each of these jaws being urged by a spring 23 towards the cam 21. The springs 23 are arranged in a bore of valve housing 1 which is closed by means of plugs 24.

Figure 4:
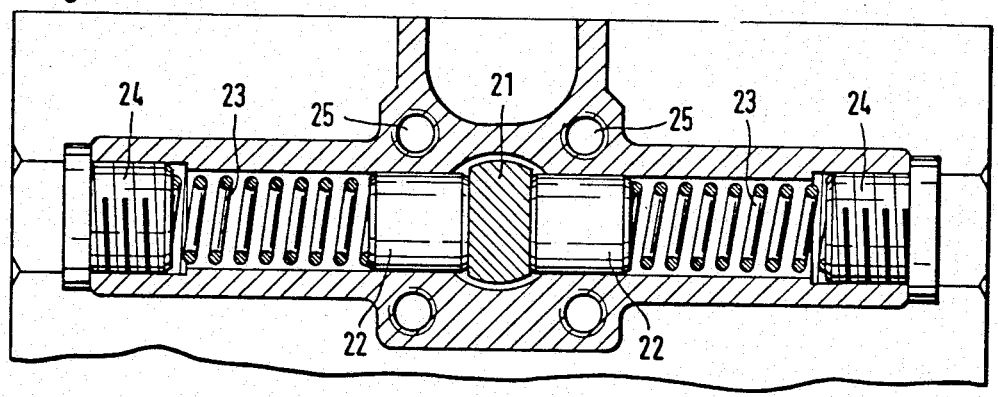
FIG. 4 is a cross-section on the line IV—IV in FIG. 2.

The effect of rotation of the actuating element 17 by means of the square 16, is that the return jaws 22 are moved apart from one another by the spreader cam 21. However, when the operating force applied to square end 16 is released, the biasing force of springs 23 acting through jaws 22 against spreader cam 21 serves to return the actuating element 17 to its rest position as shown in FIG. 4. The return jaws 22 may be formed by conventional rollers of a cylindrical roller bearing which, in itself, has the hardness required for low wear. For the same reasons, it is advisable to harden the spreader cam 21 as well. Screwthreaded holes 25 are situated in the vicinity of this return mechanism, for fixing a cover 26 (FIG. 2) which encloses, with play, a collar 27 fixed to the actuating element 17 and, hence, axially secures the actuating element 17.

On that side remote from the actuating element 17, the sleeve 9 accommodating the rotary slide valve 8 widens into a stepped sleeve 9' which receives a piston 8' which may also be regarded as an extension of the cylindrical section adjoining the rotary slide valve 8 on that side. The piston 8'—on the annular surface facing the rotary slide valve 8—is connected by a bore 32 to a line 31 through which compressed air can be admitted to the piston surface. The surrounding pressure may act on that side of the piston 8' remote from the rotary slide valve 8 via an opening 30 in the screwthreaded plug 39 which, in turn, is screwed into a cover 38 for closing the valve housing opening. Alternatively, the opening 30 may be closed either directly or indirectly, through a sealing housing cover (not shown). In that case, the scavenging air pressure acts on the corresponding side of the piston, having access through an opening 33 at the end of the stepped sleeve 9', through an annular recess located there and through a transverse bore 34. Although the depression above the transverse bore 34 is shown separated from the scavenging air outlet 3 in FIG. 2, the depression and the scavenging air outlet do communicate with one another through a connecting duct which is not visible in this sectional plane.

Irrespective of the pressure applied to that end of the piston 8' remote from the rotary slide valve 8, a spring 40 acts in the same direction, this spring 40 resting on the base of the screwthreaded plug 39 and being located in a cylindrical recess in the piston 8' on a plate 41 and an axial roller bearing 42. The axial roller bearing isolates the rotational movement of the rotary slide valve 8 and hence the piston 8' from the spring 40 held fast against rotation in the screwthreaded plug 39. The bias with which the spring 40 forces the rotary slide valve and all the components directly connected thereto back into the starting position illustrated on FIG. 2, may be varied by screwing the screwthreaded plug 39 to different depths into the cover 38. In the event of gas forces by way of line 31 and bore 32 acting on the annular piston surface, the piston 8' is displaced until the increasing counterforce of the spring 40 establishes a state of equilibrium.

Figure 3:
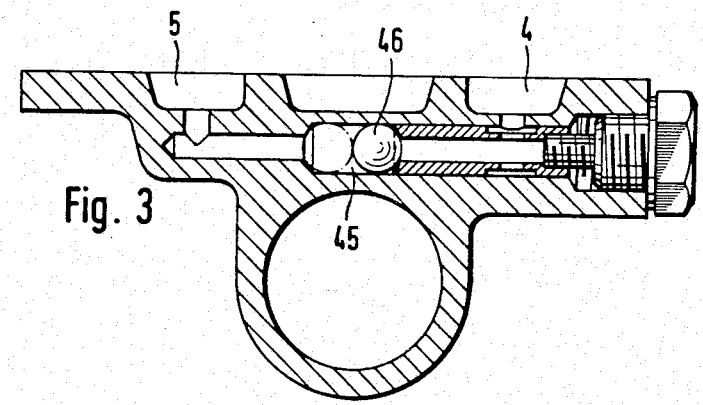
FIG. 3 is a cross-section on the line III—III in FIG. 2.

The line 31 which leads to the annular piston surface, communicates with a chamber 45 of which the surroundings and details are shown in FIG. 3. On either side, it is connected by feed lines to the first channel 4 and the second channel 5, the ends of these feed lines being in the form of spherical seats. A ball 46 is housed with limited freeplay in the chamber 45, having so much freedom of movement that, in either end position, one of the feed pipes is connected to the feed pipe 31 whilst the other feed pipe is closed. If, for example, the ball 46 is in the right-hand end position shown on FIG. 3 and compressed air is admitted to the first channel 4 through the occurrence of rotational movement of the rotary slide valve 8, the pressure increasing in the corresponding feed line to the chamber 45 displaces the ball 46 into the left-hand end position, thereby opening the path to the line 31.

In this way, the pressure of the pressurised channel 4 or 5 enters the pipe 31, while the vented channel 5 or 4 simultaneously becomes isolated. In the event of a drastic increase in pressure in the pressurised channel 4 or 5, the pressure on the annular piston of piston 8 surface also increases whereas the counter-pressure, in the form of the scavenging air pressure, is low. This results in displacement of the piston 8' and hence of the rotary slide valve 8 so that the cylinder 19 moves increasingly into the compressed air passage defined by the inflow opening 10 and the corresponding outflow opening 11 with the rotary slide valve remaining in a given rotated position. In this way, the flow of compressed air through the valve is throttled until there is no further increase in pressure in the corresponding channel 4 or 5 and hence in the line 31 as a result of the throttling effect.

If, now, the rotary slide valve 8 is turned to its rest position from the automatically established equilibrium position, the pressure in the corresonding channel 4 or 5 decreases so that the force of the spring 40 becomes greater than the gas force acting on the piston 8' through the line 31. Accordingly, all the components involved in the displacement return to their starting position illustrated in FIG. 2. If, by contrast, the rotary slide valve 8 is turned even further in the "open" direction from the above-mentioned equilibrium position, and if the controlled pneumatic unit is unable to handle the additional supply of compressed air on account of its load, the pressure in the corresponding channel 4 or 5 increases with the result that the pressure in the line 31 also increases. Accordingly, the piston 8' is displaced even further to the left (FIG. 2) against the action of the spring 40 so that the inflowing stream of compressed air is throttled to an even greater extent, resulting in a reduction in the imcoming supply of compressed air. In this way, the compressed air delivered to the pneumatic unit is limited to a predetermined value influenced by the piston surfaces and also by the bias force of the spring 40. The bias may be varied by screwing the screwthreaded plug 39 in or out to different extents.

When the opening 30 in the screwthreaded plug 39 is closed and the scavenging air pressure is acting on that end of the piston 8' remote from the rotary slide valve, the pressure supplied to the pneumatic unit is not limited in absolute terms, instead it is determined by the pressure difference between the pressure level in the inflow and in the outflow, i.e. in the scavenging air. This is because, as the counter-pressure in the scavenging air increases, the pressure acting on that end of the piston facing the cover 38 also increases so that a higher pressure is required in the line 31 until a throttling effect is again produced by axial displacement of the piston 8' and hence of the rotary slide valve 8.

The upper side the housing 1 is designed in such a way that the control valve may be directly screwed onto a correspondingly prepared receiving surface on the controlled pneumatic unit. In this way, there is no need for hose connections between the valve and the unit so that there is less danger of leakage. In that case, however, the control valve is generally beyond the reach of the operator so that cable control or lever control is necessary.

What is claimed is:

1. A pneumatic control valve for controlling the forward motion and reverse motion of a pneumatically driven apparatus comprising:

a valve housing having a longitudinal bore with a rotary slide valve member mounted therein to be rotatable and axially slidable within said bore, said housing having four connections formed therein each communicating with said bore including a compressed air supply inlet, first and second channels and a scavenging air line, said connections lying substantially in a common plane disposed transversely of the axis of said bore;

said valve member having a valve portion formed to connect said compressed air supply inlet with one of said first or second channels while the other of said channels is vented lpast said valve portion to said scavenging air line connection and a shut-off portion in said bore at one end of said valve member for throttling the air flow stream passing through said control valve;

a control piston sidably mounted in said bore axially aligned with and connected with said valve member, said shut-off portion being disposed adjacent said four connections to throttle flow through said control valve in response to movements of said control piston;

biasing means acting against one side of said control piston; and passage means formed in said valve housing to selectively apply pressured from one of said channels to the other side of said control piston.

2. A control valve as claimed in claim 1, wherein said rotary slide valve member is mounted inside a sleeve having inflow and outflow openings and externally said shut-off portion has the form of a solid cylinder.

3. A control valve as claimed in claim 1, wherein said shut-off portion is connected for axial displacement relative to an actuating element, with which it is fixed in rotation, and an actuating lever, is arranged on said actuating element.

4. A control valve as claimed in claim 3, wherein said actuating lever is a cable-operated double-armed lever.

5. A control valve as claimed in claim 3, wherein a return mechanism is provided on said actuating element for automatic spring-loaded return to a normal rest position.

6. A control valve as claimed in claim 5, wherein said return mechanism consists of a spreading cam on said actuating element and two spring-loaded return jaws mounted to act on said cam.

7. A control valve as claimed in claim 3, wherein the connection between the shut-off portion and said actuating element includes an external multi-toothed profile and said shut-off portion carries internal gearing slidably mating with said profile.

8. A control valve as claimed in claim 1, wherein said control piston is to be pressurised at one end and, is mounted on that side of the rotary slide valve member opposite the shut-off portion for effecting the axial displacement of the rotary slide valve member and said spring is mounted at the opposite end of said piston to bias said piston against said pressure.

9. A control valve as claimed in claim 8, wherein the spring is supported for rotation relative to the piston by an axial roller bearing.

10. A control valve as claimed in claim 8, wherein said piston is housed in an extension of a cylinder section adjoining said rotary slide valve member and the diameter of the cylinder section corresponds to that of said shut-off portion.

11. A control valve as claimed in claim 10, wherein an annular surface of said extension is subjected to said pressure.

12. A control valve as claimed in claim 8, wherein said pressurized end of said control piston is connected to a flow responsive switch which automatically shuts off communication of the channel which is non-pressurized from said passage.

13. A control valve as claimed in claim 12, wherein said switch consists of a chamber with lateral feed lines from the said channels and a central line to the piston, said chamber being provided with a ball for sealing off one feed line or the other.

14. A control valve as claimed in claim 1, wherein said compressed air supply connection and said scavenging air line connection are disposed generally diametrically opposite one another in said valve housing and said first and second channels are disposed, respectively, laterally on opposite sides of said scavenging air line connection.

* * * * *